United States Patent
Moribe

(10) Patent No.: US 11,090,932 B2
(45) Date of Patent: Aug. 17, 2021

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Shoei Moribe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/659,772

(22) Filed: Oct. 22, 2019

(65) Prior Publication Data

US 2020/0130353 A1 Apr. 30, 2020

(30) Foreign Application Priority Data

Oct. 25, 2018 (JP) .............................. JP2018-200675

(51) Int. Cl.
| | | |
|---|---|---|
| *B41J 2/14* | (2006.01) | |
| *B41J 2/205* | (2006.01) | |
| *B41J 2/195* | (2006.01) | |
| *B41J 2/165* | (2006.01) | |

(52) U.S. Cl.
CPC .............. *B41J 2/14* (2013.01); *B41J 2/16505* (2013.01); *B41J 2/16585* (2013.01); *B41J 2/195* (2013.01); *B41J 2/2056* (2013.01)

(58) Field of Classification Search
CPC ... B41J 2/14; B41J 2/2056; B41J 2/195; B41J 2/2142; B41J 2/2139; B41J 2/2146; H04N 1/4078; G06K 15/027
USPC ........................................................ 347/47
See application file for complete search history.

(56) References Cited

U.S. PATENT DOCUMENTS

| | | | |
|---|---|---|---|
| 9,894,250 B2 | 2/2018 | Moribe | |
| 10,026,156 B2 | 7/2018 | Moribe | |
| 10,205,854 B2 | 2/2019 | Shimada et al. | |
| 2011/0074862 A1* | 3/2011 | Sasayama | B41J 2/2139 347/19 |
| 2018/0295258 A1 | 10/2018 | Ochiai et al. | |

(Continued)

FOREIGN PATENT DOCUMENTS

| | | |
|---|---|---|
| JP | H1013674 A | 1/1998 |
| JP | 2011073286 A | 4/2011 |
| JP | 2012147126 A | 8/2012 |

*Primary Examiner* — Huan H Tran
*Assistant Examiner* — Alexander D Shenderov
(74) *Attorney, Agent, or Firm* — Carter, DeLuca & Farrell LLP

(57) ABSTRACT

An object of the present disclosure is to reduce density unevenness and streaks of an image that is printed in a case where it is not possible to implement sufficient correction only by the correction for a defective nozzle. One embodiment of the present invention is an image processing apparatus that performs processing for an input image for an image forming apparatus performing printing on a printing medium by using a print head in which a plurality of printing elements is arrayed, the image processing apparatus including: a storage unit configured to store density characteristic information indicating an output density for each tone for each of the printing elements; a target value acquisition unit configured to acquire a target characteristic indicating a target value for each tone; and a first correction unit configured to correct the input image based on the density characteristic information and the target value.

16 Claims, 10 Drawing Sheets

(56) References Cited

U.S. PATENT DOCUMENTS

2018/0324327 A1   11/2018  Moribe et al.
2019/0007580 A1    1/2019  Moribe et al.

* cited by examiner

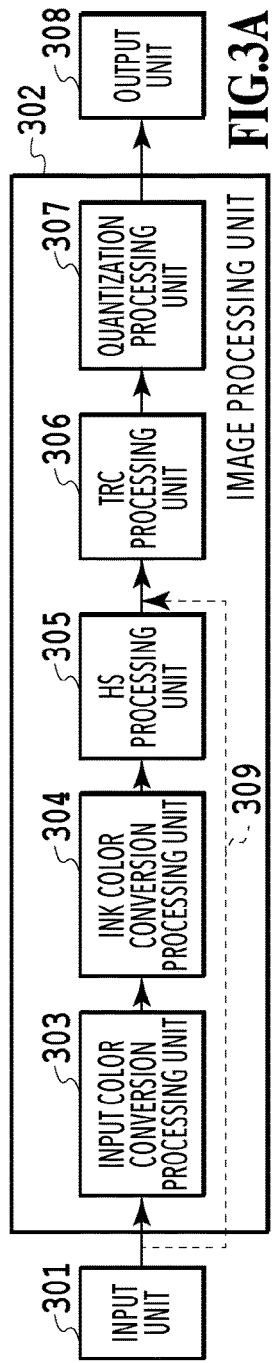
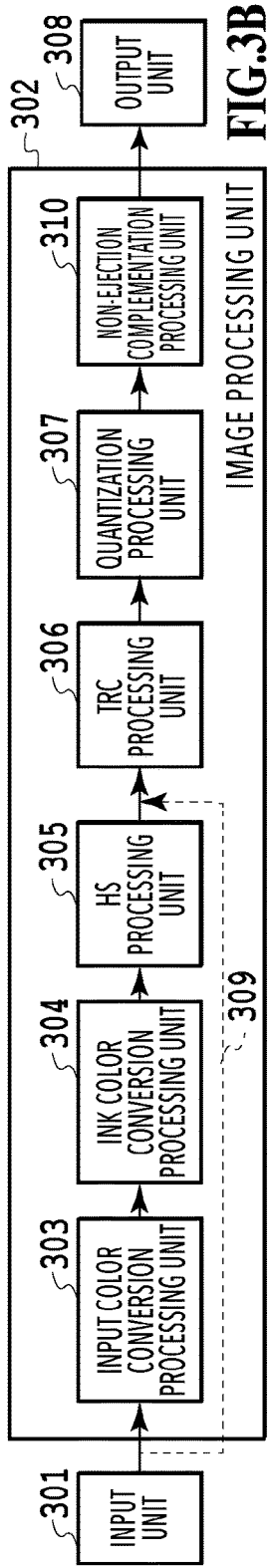
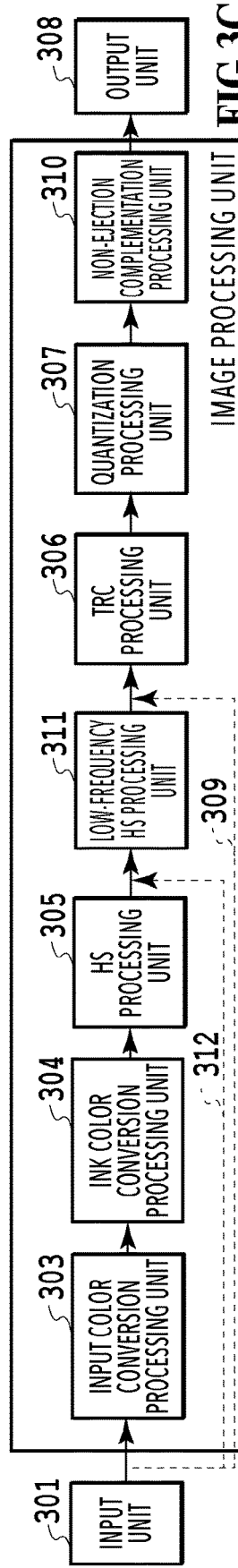
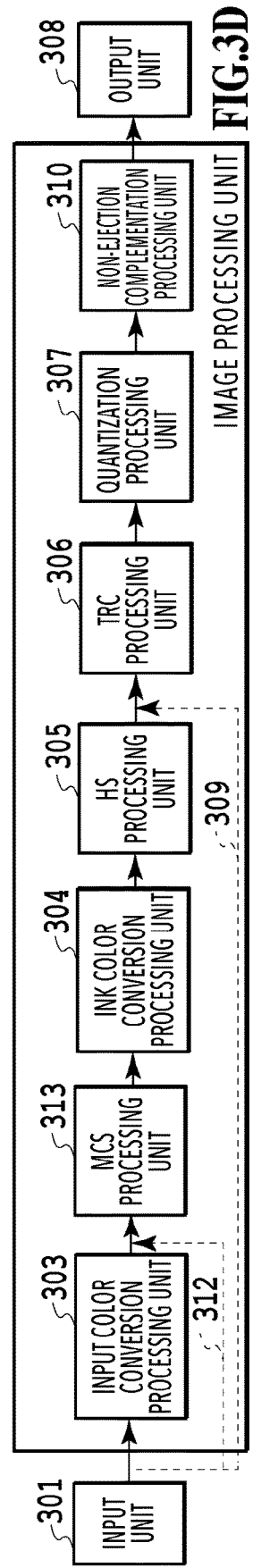

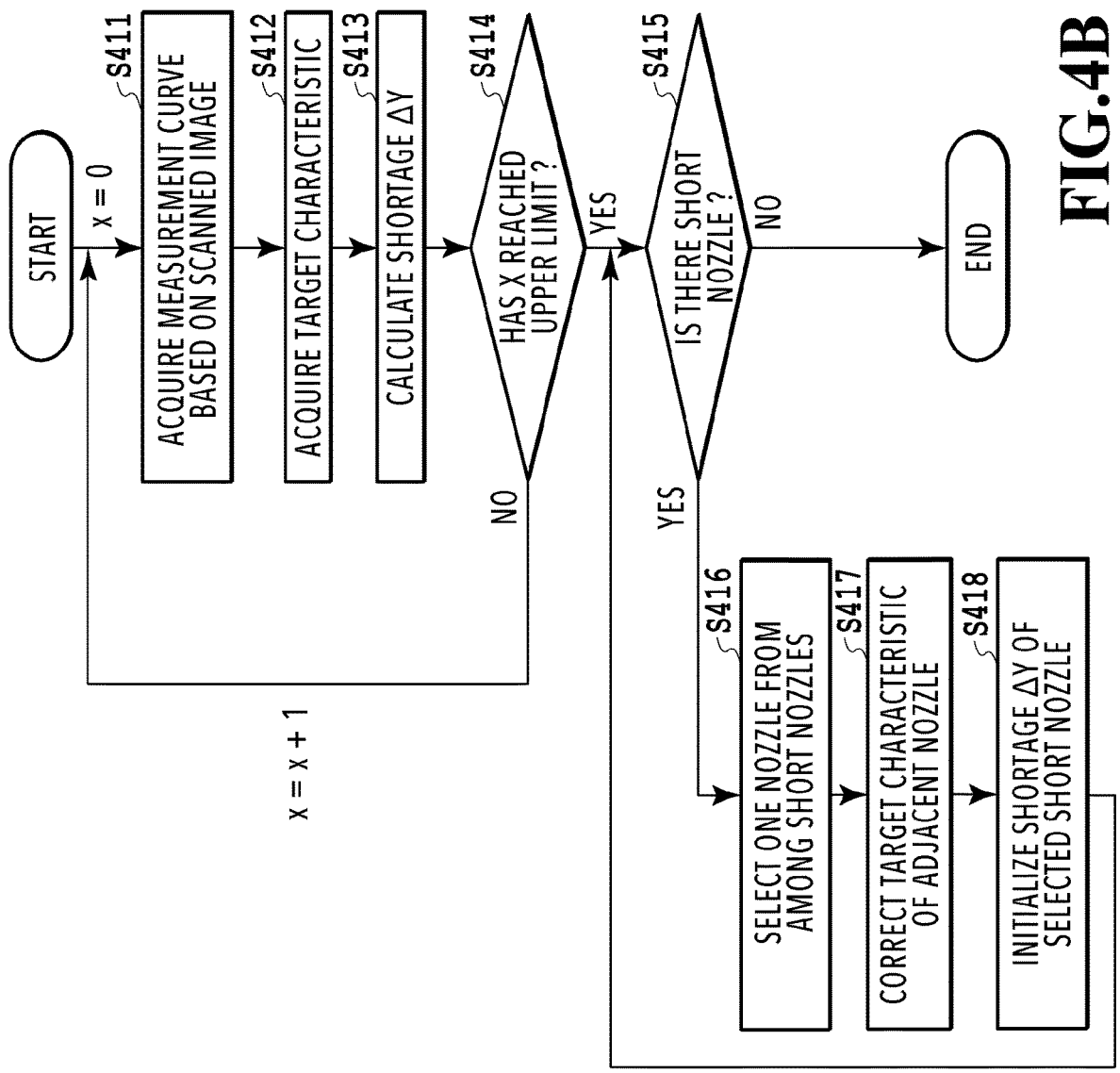
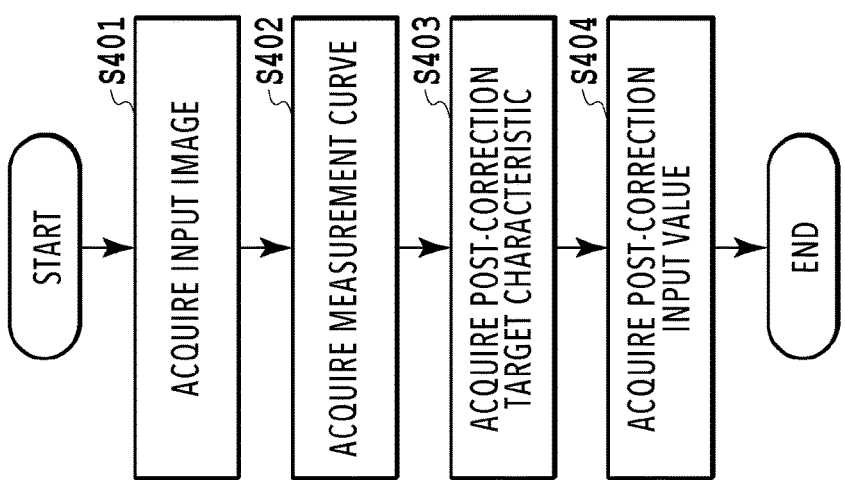
FIG.4B
FIG.4A

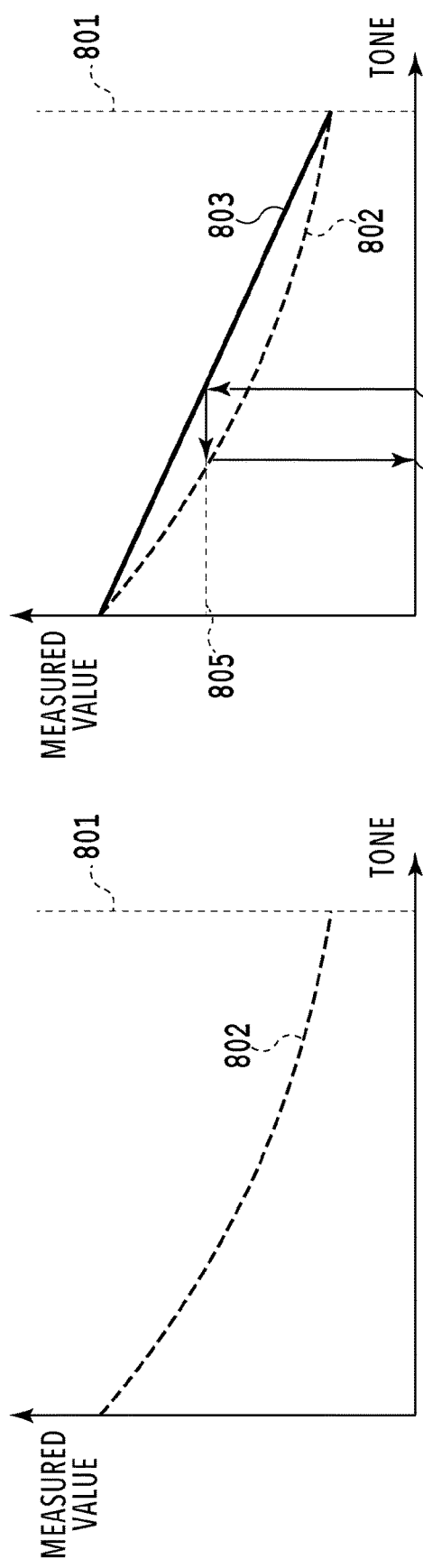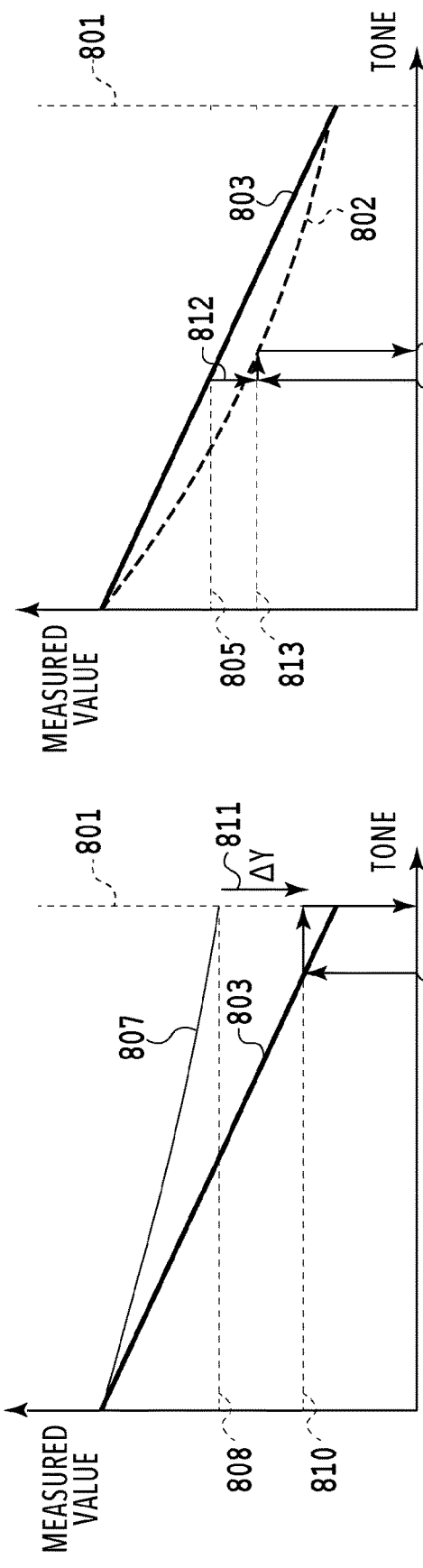

IMAGE PROCESSING APPARATUS, IMAGE PROCESSING METHOD AND STORAGE MEDIUM

BACKGROUND OF THE INVENTION

Field of the Invention

The present disclosure relates to a technique to reduce density unevenness resulting from an ejection characteristic of a plurality of nozzles ejecting ink.

Description of the Related Art

In a print head used in an ink jet printing apparatus, there is a case where a fluctuation occurs in the ejection amount between a plurality of nozzles due to an error of manufacturing thereof, or the like. In a case where there is such a fluctuation in the ejection amount, the density unevenness becomes more likely to occur in an image to be printed. Conventionally, as the processing to reduce the density unevenness such as this, the HS (Head Shading) technique as described in Japanese Patent Laid-Open No. H10-13674 is known. In the HS, based on information relating to the ejection amount of each nozzle, the image data is corrected. It is also possible to adjust the density in an image to be printed by increasing or decreasing the number of ink dots to be printed finally by this correction.

On the other hand, in a case where there is a non-ejection nozzle in the print head, a white streak occurs in an image to be printed. As the method of reducing such white streaks, the non-ejection complementation technique is known. With the non-ejection complementation technique, it is possible to make the white streak visually inconspicuous by changing the number of dots or the size of dots to be printed by the adjacent nozzle of the non-ejection nozzle. Japanese Patent Laid-Open No. 2012-147126 has described the technique to prevent interference between two pieces of processing in a case where both the HS technique and the non-ejection complementation technique are used.

SUMMARY OF THE INVENTION

However, with the conventional technique, there is a case where density unevenness or streaks remain because it is not possible to perform sufficient correction. In Japanese Patent Laid-Open No. H10-13674 and Japanese Patent Laid-Open No. 2012-147126, a predetermined target density is determined and correction is performed for an input image so that the density for each nozzle becomes the target density. At this time, there is a case where it is not possible to implement sufficient correction only by the correction for a defective nozzle. For example, in a case where the correction-target defective nozzle is a nozzle whose ejection amount is smaller than the average, it is not possible to implement the target density even though the pixel value of the input image is corrected to the maximum value.

Consequently, in view of the above-described problems, an object of the present disclosure is to reduce density unevenness or streaks in an image to be printed in a case where it is not possible to implement sufficient correction only by the correction for a defective nozzle.

One embodiment of the present invention is an image processing apparatus that performs processing for an input image for an image forming apparatus performing printing on a printing medium by using a print head in which a plurality of printing elements is arrayed, the image processing apparatus including: a storage unit configured to store density characteristic information indicating an output density for each tone for each of the printing elements; a target value acquisition unit configured to acquire a target characteristic indicating a target value for each tone; and a first correction unit configured to correct the input image based on the density characteristic information and the target value, and one of a target characteristic and a density characteristic corresponding to at least one printing element of interest of the plurality of printing elements is set based on an input value of a pixel corresponding to an adjacent printing element adjacent to the printing element of interest and an output density corresponding to the input value of the adjacent printing element.

Further features of the present invention will become apparent from the following description of exemplary embodiments with reference to the attached drawings.

BRIEF DESCRIPTION OF THE DRAWINGS

FIG. 3A to FIG. 3D are each a block diagram showing a configuration of an image processing unit in a printing apparatus according to one embodiment;

FIG. 4A and FIG. 4B are each a flowchart of processing of an HS processing unit 305 according to a first embodiment;

FIG. 8A to FIG. 8D are each a diagram for explaining processing of the HS processing unit 305 according to the second embodiment;

DESCRIPTION OF THE EMBODIMENTS

In the following, with reference to the drawings, embodiments of the present invention are explained in detail. However, contents described in the following are merely exemplary and not the gist that limits the scope of the present invention only to those.

<About Configuration of Ink Jet Printer>

Figure 1:
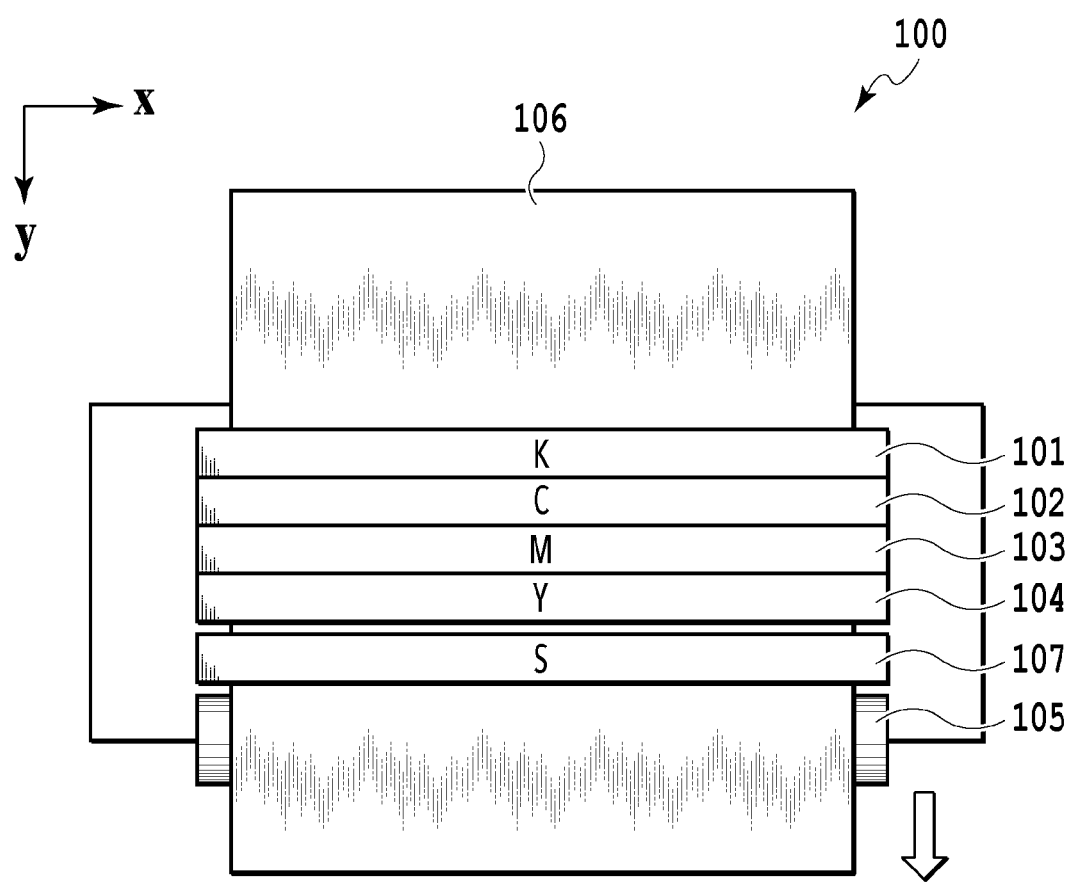
FIG. 1 is a schematic diagram of an ink jet printer according to one embodiment.

FIG. 1 is a diagram schematically showing an ink jet printer (hereinafter, simply referred to as printing apparatus) 100 according to one embodiment. As shown in FIG. 1, the printing apparatus 100 includes print heads 101 to 104 on a frame configuring a structural material of the printing apparatus 100. The print head 101 has a plurality of printing elements (hereinafter, referred to as nozzles) ejecting K ink. Further, the print head 102 has a plurality of nozzles ejecting C ink, the print head 103 has a plurality of nozzles ejecting M ink, and the print head 104 has a plurality of nozzles ejecting Y ink. In the present specification, each ink color is represented by one character, specifically, black is represented by K, cyan by C, magenta by M, and yellow by Y.

Further, red is represented by R, green by G, and blue by B. Each of the print heads 101 to 104 is a so-called full line type print head in which a plurality of nozzles is arrayed along a predetermined direction (x-direction in FIG. 1) in a range corresponding to the width of a printing sheet 106. The resolution of nozzle arrangement in the nozzle row of each ink color is 1,200 dpi.

The printing sheet 106 as a printing medium is conveyed in a predetermined direction (y-direction indicated by thick-line arrow in FIG. 1) by a conveyance roller 105 (and other rollers, not shown schematically) rotating by the driving force of a motor (not shown schematically). Then, while the printing sheet 106 is being conveyed, by printing color materials, that is, inks being ejected from the plurality of nozzles of each of the print heads 101 to 104 in accordance with print data, an image corresponding to one raster, which corresponds to the nozzle row of each print head, is printed sequentially. Further, at the position downstream of the print heads 101 to 104 in the y-direction, a scanner 107 is arranged in which reading elements are arrayed at a predetermined pitch in the state of being parallel to the print heads 101 to 104. It is possible for the scanner 107 to read an image printed by the print heads 101 to 104 and output as multi-valued image data in which each pixel has a 3-channel value of R, G, and B. By repeating the ejection operation of ink from each print head to the printing sheet that is conveyed, for example, it is possible to print an image corresponding to one page. The printing apparatus to which the present invention can be applied is not limited to the full line type printing apparatus explained above. For example, it is also possible to apply the present invention to a so-called serial type printing apparatus that performs printing by causing the print head to scan in the direction intersecting the conveyance direction of a printing sheet.

<About Configuration of Printing System>

Figure 2:
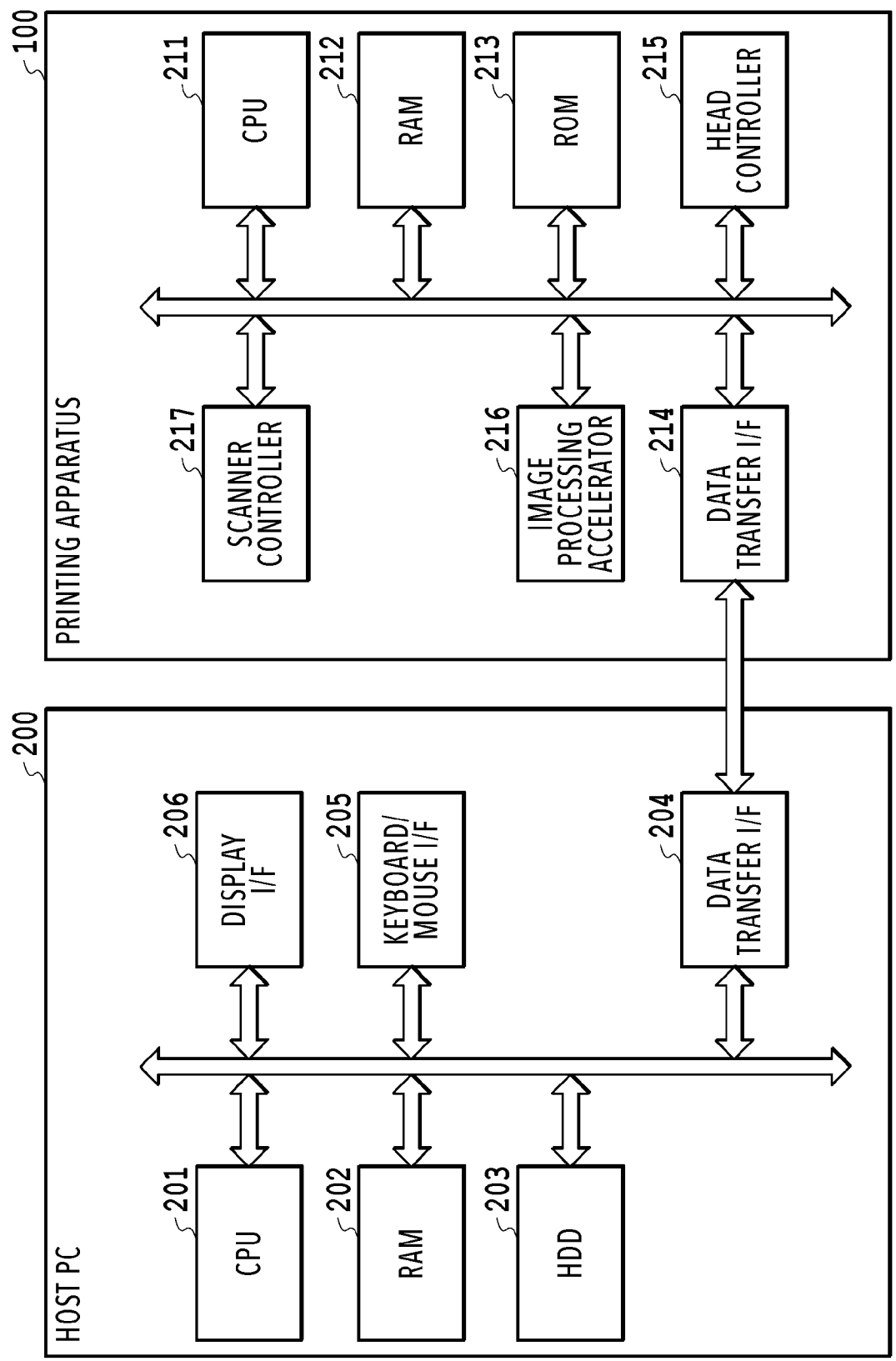
FIG. 2 is a block diagram showing a configuration of a printing system according to one embodiment.

FIG. 2 is a block diagram showing a printing system according to one embodiment. As shown in FIG. 2, the printing system has the printing apparatus 100 shown in FIG. 1 and a personal computer (hereinafter, simply referred to as host PC) 200 as a host apparatus thereof.

First, components of the host PC 200 are explained. A CPU 201 performs processing in accordance with programs stored in an HDD 203 and a RAM 202, which are storage units. The RAM 202 is a volatile storage and temporarily stores programs, data, and the like. Further, the HDD 203 is a nonvolatile storage and similarly stores programs, data, and the like. A data transfer I/F (I/F is an abbreviation of interface) 204 controls transmission and reception of data between the host PC 200 and the printing apparatus 100. As the connection method of the data transmission and reception, it is possible to adopt USB, IEEE 1394, LAN, and the like. A keyboard/mouse I/F 205 is an I/F that controls an HID (Human Interface Device), such as a keyboard and a mouse. Data indicating the contents input by a user using the HID is delivered to the CPU 201 via the keyboard/mouse I/F 205. A display I/F 206 controls a display on a display (not shown schematically). The host PC 200 may include components other than those described previously.

Following the above, components of the printing apparatus 100 are explained. A CPU 211 performs processing in accordance with programs stored in a ROM 213 and a RAM 212. This processing includes processing in each embodiment, to be described later. The RAM 212 is a volatile storage and temporarily stores programs, data, and the like. Further, the ROM 213 is a nonvolatile storage and can store table data that is created by processing of each embodiment, to be described later, programs, and the like. A data transfer I/F 214 controls transmission and reception of data between the printing apparatus 100 and the host PC 200. A head controller 215 controls the ejection operation of the print head as well as supplying print data to each of the print heads 101 to 104 shown in FIG. 1. Specifically, it is possible to configure the head controller 215 so as to read control parameters and print data from a predetermined address of the RAM 212. In a case where the CPU 211 writes the control parameters and the print data to this predetermined address of the RAM 212, the processing by the head controller 215 is started and inks are ejected from the print heads 101 to 104.

The CPU 211 functions also as a print control unit for printing a measurement image, to be described later. An image processing accelerator 216 is configured by hardware and is capable of performing image processing at a speed higher than that of the CPU 211. Specifically, it is possible to configure the image processing accelerator 216 so as to read parameters and data necessary for image processing from a predetermined address of the RAM 212. In a case where the CPU 211 writes these parameters and data to this predetermined address of the RAM 212, the image processing accelerator 216 is activated and predetermined image processing is performed. In the following embodiments, processing to generate parameters of a table used in a head shading processing unit (hereinafter, abbreviated to HS processing unit), to be described later, is performed by a software component implemented by the CPU 211. On the other hand, image processing necessary at the time of printing, including the processing of the HS processing unit, is performed by the image processing accelerator 216, which is a hardware component. The image processing accelerator 216 is not an indispensable component and it may also be possible to perform the table parameter generation processing and the image processing only by the processing by the CPU 211 in accordance with the specifications or the like of the printer. A scanner controller 217 controls individual reading elements of the scanner 107 shown in FIG. 1 and at the same time, outputs RGB data obtained from these elements to the CPU 211. The printing apparatus 100 may include components other than those described previously.

Several embodiments for reducing density unevenness and streaks in the printing system explained above are explained in the following.

First Embodiment

In the present embodiment, in a case where only the HS processing for a defective nozzle is not sufficient, correction processing is performed for the nozzle adjacent to the defective nozzle. FIG. 3A is a block diagram showing the configuration of an image processing unit 302 in the printing apparatus 100 according to the present embodiment. That is, in the present embodiment, it is assumed that each component of the image processing unit 302 is implemented by each element for control and processing of the printing apparatus 100 shown in FIG. 2. In the following, a configuration is illustrated in which all the components of the image processing unit 302 are included in the printing apparatus 100, but the configuration of the image processing unit is not limited to this. For example, it may also be possible to configure the image processing unit in the host PC 200 shown in FIG. 2 or it may also be possible to configure a part of the image processing unit in PC 200 and the other parts in the printing apparatus 100.

As shown in FIG. 3A, the printing apparatus 100 has an input unit 301, the image processing unit 302, and an output unit 308. To the input unit 301, image data transmitted from the host PC 200 is input and the input unit 301 delivers the input image data to the image processing unit 302. The image processing unit 302 has an input color conversion processing unit 303, an ink color conversion processing unit 304, an HS (Head Shading) processing unit 305, a TRC (Tone Reproduction Curve) processing unit 306, and a quantization processing unit 307.

In the image processing unit 302, first, the input color conversion processing unit 303 converts the image data delivered from the input unit 301 into image data corresponding to the color reproduction area of the printing apparatus 100. In the present embodiment, the image data delivered from the input unit 301 is data indicating color coordinates (R, G, B) in the color space coordinates, such as sRGB, which are representation colors of a monitor, and each value of R, G, and B is represented by eight bits. The input color conversion processing unit 303 converts this image data into image data corresponding to the color reproduction area of the printing apparatus 100, which is a color signal configured by three components. The image data after conversion here is image data in the bitmap format in which each pixel has a 3-channel (referred to as R', G', and B') pixel value. Each value of R', G', and B' is represented by eight bits. For the conversion from each value of R, G, and B into each value of R', G', and B', it is possible to use a publicly known method, such as matrix arithmetic processing and processing using a three-dimensional lookup table (hereinafter, described as 3D LUT). In the present embodiment, a 3D LUT is used and conversion processing is performed also by using an interpolation arithmetic operation. The resolution of 8-bit image data handled in the image processing unit 302 is 1,200 dpi, which is the same as the resolution of the nozzle arrangement of the print head.

The ink color conversion processing unit 304 performs conversion processing to convert the image data converted by the input color conversion processing unit 303 into color signals corresponding to a plurality of inks used in the printing apparatus 100. The printing apparatus 100 of the present embodiment uses black (K), cyan (C), magenta (M), and yellow (Y) inks, and therefore, the image data of the RGB signal is converted into image data including an 8-bit color signal of each of K, C, M, and Y. This color conversion is also performed by using both the 3D LUT and the interpolation arithmetic operation as in the case with the conversion processing in the input color conversion processing unit 303 described previously. As another conversion method, it is also possible to use a method, such as matrix arithmetic processing, as in the case with the conversion processing described previously.

The HS processing unit 305 performs correction in accordance with the density characteristic indicating the output density for each tone of each nozzle configuring the print head for the image data of the ink color signal converted by the ink color conversion processing unit 304. Details of the HS processing will be described later.

The TRC processing unit 306 adjusts the number of dots to be printed by the output unit 308 for each ink color for the image data including the 8-bit ink color signal of each of K, C, M, and Y for which the HS processing has been performed. In detail, by correcting the image data so that the relationship between the number of dots to be printed on a printing medium and the lightness implemented by the number of dots becomes linear, the number of dots to be printed on a printing medium is adjusted.

The quantization processing unit 307 obtains one-bit (binary) data by performing quantization processing for the image data including the 8-bit (256 values) ink color signal of each of K, C, M, and Y processed by the TRC processing unit 306. As the quantization processing method, a dither method is used in the present embodiment, but it may also be possible to use another pseudo halftone processing, such as an error diffusion method.

The output unit 308 performs printing by driving the print head based on the dot data obtained by quantization and ejecting each color ink onto a printing medium. Specifically, the output unit 308 includes a printing mechanism including the print heads 101 to 104 shown in FIG. 1.

<About HS Processing>

In the following, the HS processing performed by the HS processing unit 305 is explained by using FIG. 4A to FIG. 6C.

Figure 5:
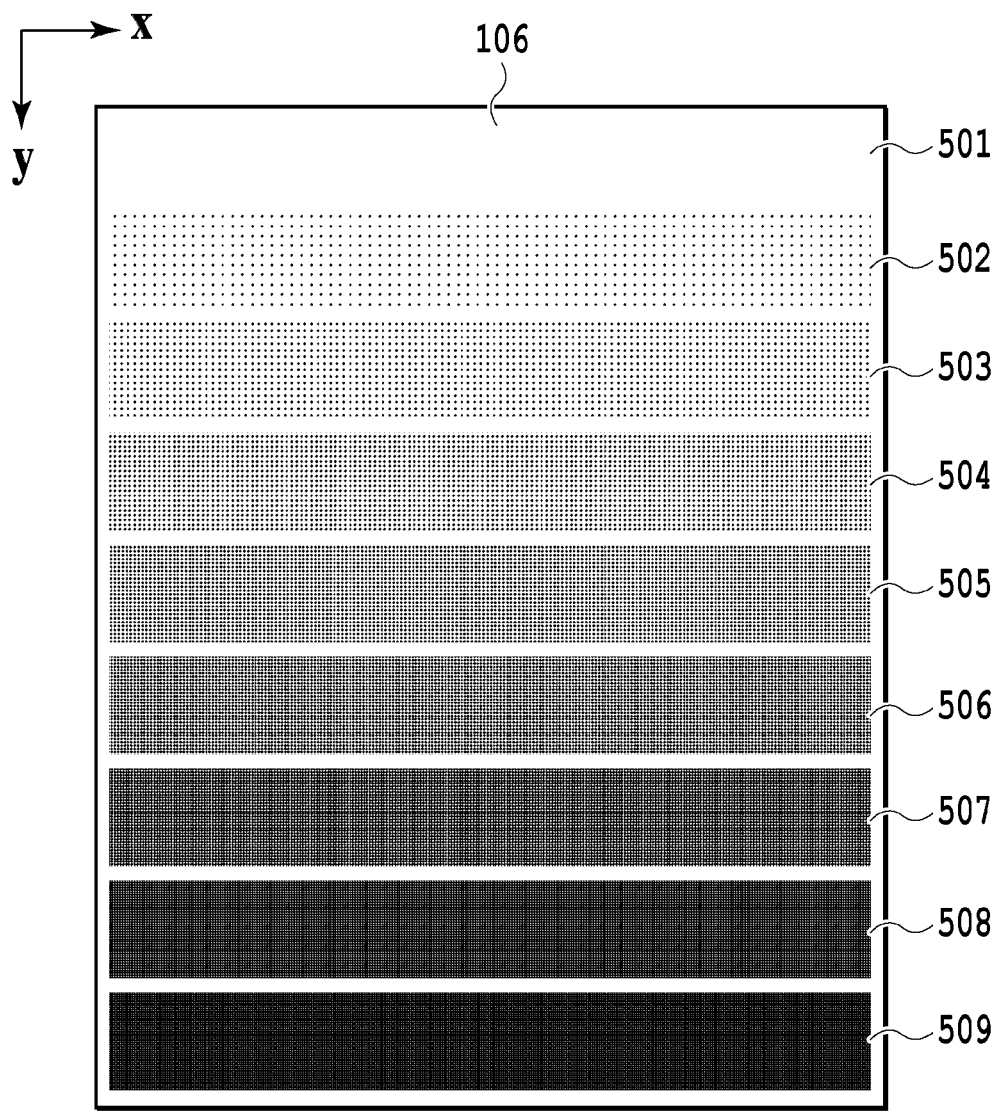
FIG. 5 is a diagram showing an example of a measurement image.

FIG. 5 is a diagram showing an example of a measurement image for acquiring the density characteristic for each nozzle configuring the print head. On the printing sheet 106, patches 501 to 509 of nine tones are printed. These patches are printed in a single ink color and in the following, explanation is given by using an example in which these patches are printed only in the K ink ejected from the print head 101.

In the present embodiment, at the time of printing a measurement image, printing is performed only in a single ink color, and therefore, the input image passes through a bypass path 309 indicated by a broken line in FIG. 3A. By designing such a configuration, it is possible to input the input image directly to the TRC processing unit 306 without passing through the input color conversion processing unit 303, the ink color conversion processing unit 304, and the HS processing unit 305.

By scanning the printing sheet 106 on which the measurement image is printed by the scanner 107, image data in the bitmap format in which each pixel has a 3-channel value of R, G, and B is obtained. The image data acquired by scanning the measurement image and so on is referred to as a scanned image. The acquired 3-channel scanned image is converted into 1-channel scanned image by using a color conversion table prepared in advance in accordance with the color characteristic of the scanner. In this example, a color conversion table for converting a combination of 3-channel pixel values of R, G, and B into a 16-bit 1-channel pixel value linear to Y in the CIEXYZ color space is used. The color space of a 1-channel scanned image is arbitrary and as a 1-channel value, a value corresponding to L* of CIELab* or a value corresponding to the density can be used. Further, in a case where the measurement image is printed in color inks, such as C, M, and Y, it is also possible to use a value corresponding to saturation in place of a value corresponding to brightness. In this example, the scan resolution is 1,200 dpi, which is the same as the resolution of the nozzle arrangement of the print head.

FIG. 4A is a flowchart of the HS processing performed by the HS processing unit 305. In the HS processing, first, at step S401, the HS processing unit 305 acquires an input image. Specifically, the input image that is acquired at this step is image data of ink color signals output from the ink color conversion processing unit 304. In the following, "step S-" is simply described as "S-".

At S402, the HS processing unit 305 acquires a measurement curve of the position corresponding to the pixel of interest as density characteristic information on the printing element corresponding to the pixel of interest based on the 1-channel scanned image obtained by performing a scan by the scanner 107, and so on. Here, the measurement curve is a curve obtained by plotting the signal value of the scanned image and performing interpolation between plotted points.

Figure 6A:
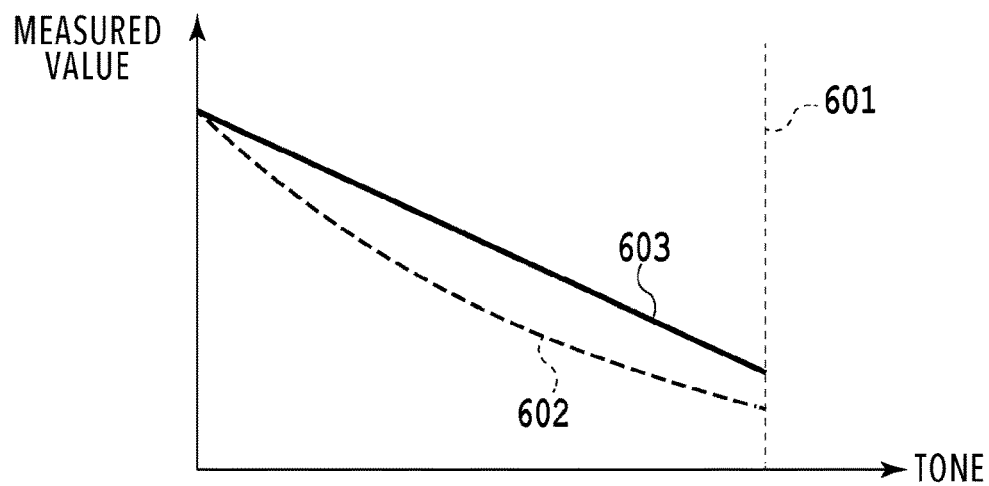
FIG. 6A to FIG. 6C are each a diagram for explaining processing of the HS processing unit 305 according to the first embodiment.

FIG. 6A shows an example of the measurement curve acquired at S402. In FIG. 6A, the horizontal axis represents the input signal value of the measurement image and the vertical axis represents the signal value of the scanned image. A broken line 601 in FIG. 6A indicates the upper limit value of the input signal value of the measurement image and is a value corresponding to the patch 509. In this example, the input signal value is represented by eight bits, and therefore, the upper limit value is taken to be 255. A measurement curve 602 in FIG. 6A is a measurement curve obtained by applying an interpolation arithmetic operation to the scanned image signal value corresponding to each of the patches 501 to 509 of nine tones. In this example, as the interpolation method, piecewise linear interpolation is used. However, as the interpolation method, it may also be possible to use an arbitrary method and a publicly known spline curve may be used.

The measurement curve 602 represents the density characteristic of the nozzle corresponding to a pixel position x and the curve such as this is obtained in the number corresponding to the number of nozzles used at the time of printing the measurement image. That is, the measurement curve different in accordance with the density characteristic of the nozzle is obtained for each nozzle. For example, the measurement curve of a nozzle whose ejection amount is relatively small shifts upward in FIG. 6A (that is in a brighter direction) compared to the measurement curve of a nozzle whose ejection amount is relatively large.

At S403, the HS processing unit 305 acquires a post-correction target characteristic of the position corresponding to the pixel of interest. Here, the post-correction target characteristic is the target characteristic that is corrected in accordance with the measurement curve of each nozzle. In the present example, it is assumed that the post-correction target characteristic is generated in advance by target characteristic correction processing. Details of the target characteristic correction processing will be described later (see FIG. 4B).

Figure 6B:
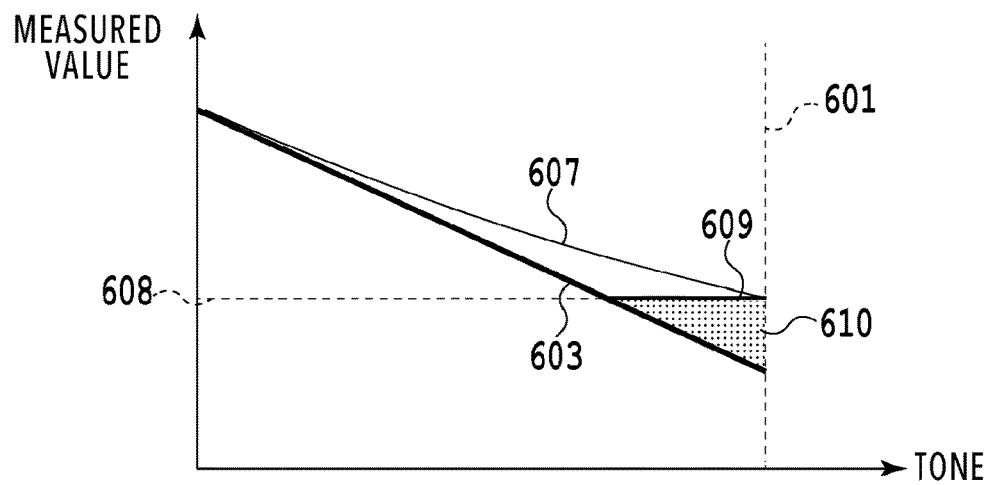
Figure 6C:
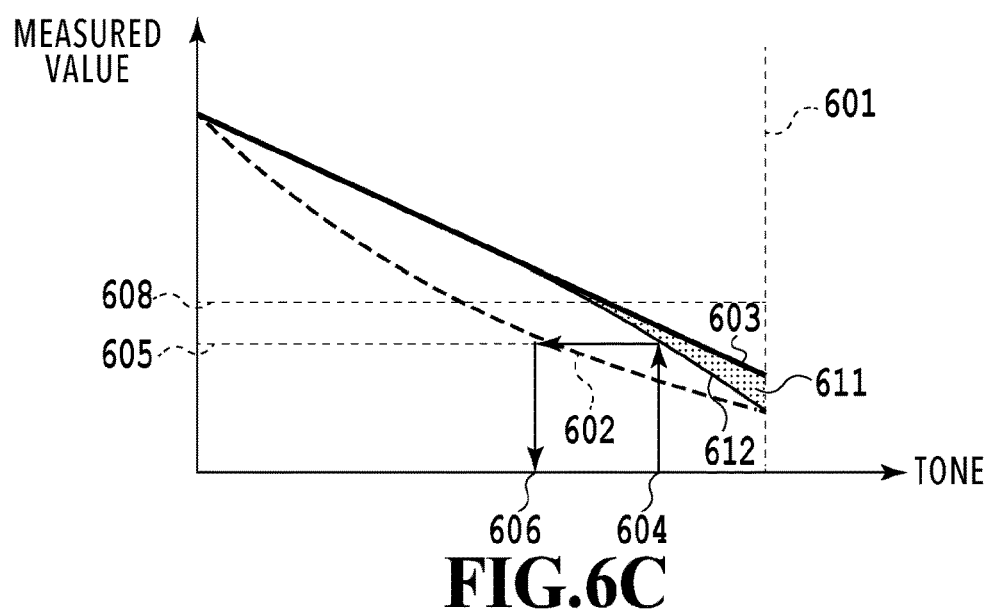

At S404, the HS processing unit 305 acquires a post-correction input value. Acquisition of the post-correction input value at this step is explained by using the example in FIG. 6C. In FIG. 6C, symbol 604 indicates the input value obtained at S401 and symbol 612 indicates the post-correction target characteristic acquired at S403. At this time, in accordance with the post-correction target characteristic 612, a target value 605 corresponding to the input value 604 is acquired. Then, in accordance with the measurement curve 602, the tone value corresponding to the target value 605 is acquired as a post-correction input value 606. With the above, the HS processing in the HS processing unit 305 is completed.

The above is the contents of the HS processing performed by the HS processing unit 305 according to the present embodiment.

<About Target Characteristic Correction Processing>

In the following, the target characteristic correction processing is explained by using FIG. 4B. FIG. 4B is a flowchart of the target characteristic correction processing.

First, at S411, the CPU 211 acquires the measurement curve of the pixel position corresponding to the nozzle position x based on the scanned image obtained by performing a scan by the scanner 107. The initial value of the nozzle position x is 0.

At S412, the CPU 211 acquires the target characteristic. In this example, a straight line connecting the average measured value for the patch 501, which is a paper white area, and the average measured value for the patch 509, which is the highest density area, is determined as the target characteristic. A straight line 603 in FIG. 6A indicates an example of the target characteristic that is acquired at this step.

At S413, the CPU 211 calculates a shortage $\Delta Y$. The shortage in the present embodiment indicates tones that cannot be reproduced in a case of following the measurement curve of the printing element of interest (nozzle of interest) and means the magnitude of a difference between the target value and the measured value. An example of the shortage is shown in FIG. 6B. Symbol 607 in FIG. 6B indicates the density characteristic of a certain nozzle and symbol 603 indicates the target characteristic. In the nozzle having the density characteristic 607, even though the post-correction input value is increased up to the upper limit value 601, the measured value of the scanned image changes only up to a value indicated by symbol 608, and therefore, a high density cannot be implemented. Because of this, for the target characteristic 603, a shortage of tones that should be reproduced in a shaded area 610 in FIG. 6B occurs.

At S414, the CPU 211 determines whether the nozzle position x has reached the upper limit. In a case where determination results at this step are affirmative, the processing advances to S415. On the other hand, in a case where determination results at this step are negative, 1 is added to x and the processing returns to S411.

At S415, the CPU 211 determines whether there is a nozzle whose shortage is not zero (hereinafter, referred to as a short nozzle). Here, the short nozzle means a nozzle whose $\Delta Y$ is not 0. In a case where determination results at this step are affirmative, the processing advance to S416. On the other hand, in a case where determination results at this step are negative, the target characteristic correction processing is terminated.

At S416, the CPU 211 selects one nozzle from among the short nozzles. The short nozzle selected at this step is referred to as a short nozzle of interest. Here, as an example, it is assumed that the short nozzle is selected in order from the short nozzle whose x is the smallest. As the selection method of a short nozzle at this step, it may also be possible to adopt an arbitrary method.

At S417, the CPU 211 corrects the target characteristic of the nozzle (hereinafter, referred to as adjacent nozzle) adjacent to the short nozzle of interest. In detail, in order to make up for the shortage $\Delta Y$ in the short nozzle of interest by using the adjacent nozzle of the short nozzle of interest, the target characteristic of the adjacent nozzle is shifted in the downward direction (that is, in the darker direction). Here, the adjacent nozzle mean the two nozzles adjacent to the short nozzle of interest in the x-direction (horizontal direction). FIG. 6C is a diagram showing an example in which the target characteristic of the adjacent nozzle is corrected, and showing that the post-correction target characteristic 612 is obtained as a result of shifting the target characteristic 603 of the adjacent nozzle on the right side (or the left side) of the short nozzle of interest in the downward direction. As shown in a shaded area 611 in FIG. 6C, at each tone value, the target characteristic 603 is shifted downward by $\Delta Y/2$. As described above, in the present embodiment, in order to make up for the shortage $\Delta Y$ in the short nozzle of interest, the target characteristic of each nozzle on the left side and the right side of the short nozzle of interest is shifted downward so that the difference between the post-correction target characteristic and the target characteristic (before correction) is equal to $\Delta Y/2$ at each tone level.

At S418, the CPU 211 initializes the shortage ΔY of the short nozzle of interest to 0. In a case where S418 is completed, the processing returns to S415 and whether there is a short nozzle is determined again. The above is the contents of the target characteristic correction processing according to the present embodiment.

<About Effect and Modification Example of the Present Embodiment>

As explained above, according to the present embodiment, in a case where it is not possible to implement sufficient correction only by the HS processing for a defective nozzle, it is made possible to reduce density unevenness and streaks in an image that is printed.

In the example described above, as the shortage, the difference between the target value and the measured value before correction is used, but the shortage that is used is not limited to this and it may also be possible to use a difference between the target value and the measured value after correction.

Further, in the example described above, the aspect is described in which printing is performed by also using the short nozzle. However, it may also be possible to regard the short nozzle whose shortage is more than or equal to a predetermined threshold value as the defective nozzle that should not be used and correct the input value for the short nozzle, specifically, change the input value to a value indicating non-ejection. In this case, the input tone value after correction is 0.

Second Embodiment

In the first embodiment, the aspect is explained in which in a case where it is not possible to sufficiently reduce density unevenness or streaks only by the HS processing for a defective nozzle, correction is performed for the target characteristic of the nozzle adjacent to the defective nozzle. However, in the first embodiment in which the shortage ΔY is calculated for each printing position of interest, in a case the input image is not uniform, there is a possibility that unfavorable correction is performed. For example, a case is considered where the shortage ΔY that occurs in a defective nozzle whose ejection amount is small is compensated for by shifting the target characteristic of the adjacent nozzle in the downward direction. At this time, in a case where an image in which the portion corresponding to the defective nozzle is white (there is no ejection) and the portion corresponding to the adjacent nozzle is not white (there is ejection) is input as the input image, it is not necessary to compensate for the shortage by the adjacent nozzle. However, as a result of execution of printing by the adjacent nozzle in accordance with the post-correction target characteristic, unnecessary correction is performed.

Consequently, in the present embodiment, an aspect is explained in which trouble in a case where the input image is not uniform is suppressed by calculating the shortage ΔY that takes the input image into consideration in the HS processing. Explanation of the configuration and processing in common to those of the first embodiment is omitted or simplified.

<About HS Processing>

Figure 7:
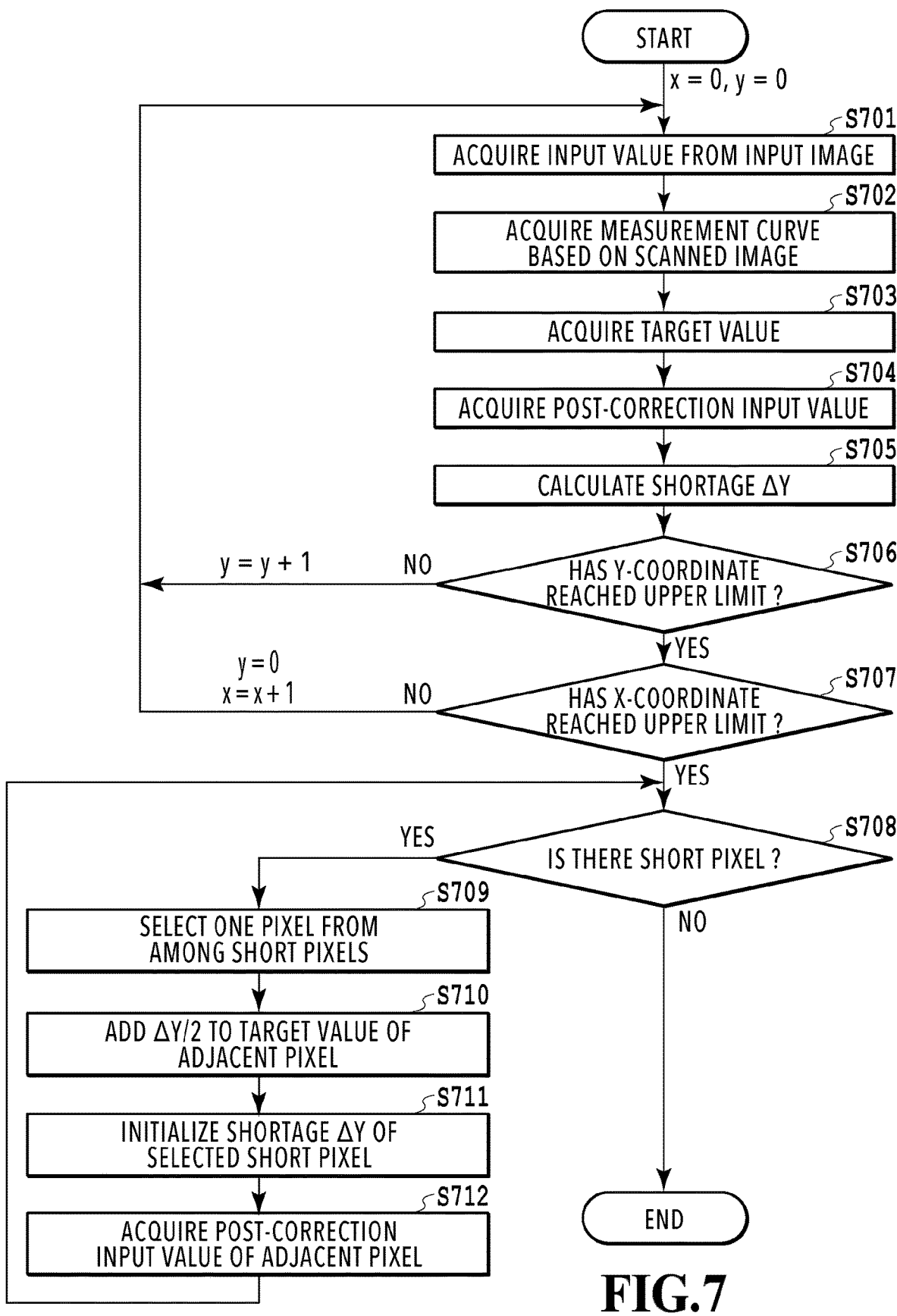
FIG. 7 is a flowchart of processing of the HS processing unit 305 according to a second embodiment.

In the following, the HS processing according to the present embodiment is explained by using FIG. 7 to FIG. 8D. FIG. 7 is a flowchart of the HS processing performed by the HS processing unit 305 according to the present embodiment.

First, at S701, the HS processing unit 305 takes the image data of the ink color signals output by the ink color conversion processing unit 304 as an input image and acquires the pixel value of the pixel of interest of the input image as the input value. It is assumed that the position of the pixel of interest is (x, y). The initial value of the position of the pixel of interest (x, y) is (0, 0).

The following processing is performed for each ink color of the input image. It is possible to perform the processing for each ink color independently and perform the processing in parallel.

At S702, the HS processing unit 305 acquires a measurement curve corresponding to the position of the pixel of interest based on the scanned image obtained by performing a scan by the scanner 107. FIG. 8A is a diagram showing a measurement curve 802 as an example of the measurement curve that is acquired at this step.

At S703, the HS processing unit 305 acquires the target value in accordance with the target characteristic. In the following, specific explanation is given. In this example, a straight line connecting the average measured value for the patch 501, which is the paper white area, and the average measured value for the patch 509, which is the highest density area, is determined as the target characteristic. A straight line 803 in FIG. 8B indicates an example of the target characteristic that is acquired at this step. Next, in accordance with the acquired target characteristic 803, a measured value 805 corresponding to an input value 804, which is a tone value, is acquired as the target value.

At S704, the HS processing unit 305 acquires the post-correction input value. For example, as shown in FIG. 8B, in accordance with the measurement curve 802, a tone value 806 corresponding to the target value 805 is acquired as the post-correction input value.

At S705, the HS processing unit 305 calculates the shortage ΔY. The shortage in the present embodiment means the amount that is short only by the correction at 704, that is, the amount of correction that is short and can be calculated by using equation (1) below.

[Mathematical Equation 1]

$$\Delta Y = \text{target value} - \text{measured value corresponding to post-correction input value that is found in accordance with density characteristic} \quad \text{equation (1)}$$

In the example shown in FIG. 8B, ΔY=0.

As an example at S705, FIG. 8C shows a case where the shortage ΔY is found in accordance with a density characteristic 807 of a nozzle whose ΔY is not 0 (ΔY≠0). In this nozzle, even though the post-correction input value is increased up to the upper limit (symbol 801), the value of the density characteristic only changes up to a value indicated by symbol 808. Because of this, in a case where an input value indicated by symbol 809 is input, it is not possible to implement a target value 810, and therefore, the shortage ΔY indicated by symbol 811 occurs.

The data of the shortage ΔY calculated at S705 is stored along with the data of the corresponding pixel position (x, y) until the HS processing for the ink color of interest is completed.

At S706, the HS processing unit 305 determines whether the y-coordinate of the pixel of interest has reached the upper limit (in other words, whether the position of the pixel of interest has reached the bottom end of the input image). In a case where determination results at this step are affirmative, the processing advances to S707. On the other hand, in a case where determination results at this step are negative, 1 is added to the value of y and the processing returns to S701.

At S707, the HS processing unit 305 determines whether the x-coordinate of the pixel of interest has reached the upper limit (in other words, whether the position of the pixel of interest has reached the right end of the input image). In a case where determination results at this step are affirmative, the processing advances to S708. On the other hand, in a case where determination results at this step are negative, the value of y is initialized to 0, 1 is added to the value of x, and the processing returns to S701.

At S708, the HS processing unit 305 determines whether there is a pixel whose shortage is not zero (hereinafter, referred to as a short pixel). Here, the short pixel means a pixel whose $\Delta Y$ is not 0 ($\Delta Y \neq 0$). In a case where determination results at this step are affirmative, the processing advances to S709. On the other hand, in a case where determination results at this step are negative, the HS processing of the ink color of interest is terminated.

At S709, the HS processing unit 305 selects one pixel from among the short pixels. The short pixel selected at this step is referred to as a short pixel of interest. In this example, it is assumed that the short pixel is selected in the scan order described above. That is, the short pixel is selected in order from the short pixel whose x is the smallest and in a case where x is the same, the short pixel is selected in order from the short pixel whose y is the smallest. It may also be possible to use an arbitrary method as the selection method of a short pixel at this step.

At S710, the HS processing unit 305 adds $\Delta Y/2$ to the target value for the adjacent pixel of the short pixel of interest. Here, the adjacent pixel means the two pixels adjacent to the short pixel of interest in the x-direction (horizontal direction). FIG. 8D shows an example in which $\Delta Y/2$ is added to the target value of the adjacent pixel. First, for the input value indicated by symbol 804, the target value 805 is determined. Next, to the target value 805, $\Delta Y/2$ indicated by symbol 812 is added and the target value becomes a value indicated by symbol 813.

At S711, the HS processing unit 305 initializes the shortage $\Delta Y$ in the short pixel of interest to 0.

At S712, the HS processing unit 305 acquire the post-correction input value of the adjacent pixel. The acquisition method of the post-correction input value is the same as that at S704. In the example shown in FIG. 8D, a post-correction input value 814 is acquired based on the target value 813 to which $\Delta Y/2$ is added and the measurement curve 802. In a case where the processing at S712 is completed, the processing returns to S708 and whether there is a short pixel is determined again. The above is the contents of the HS processing according to the present embodiment.

<About Effect and Modification Example of the Present Embodiment>

As explained above, according to the present embodiment, it is made possible to reduce density unevenness and streaks while suppressing trouble in a case where an input image is not uniform.

In the example described above, in order to simplify explanation, the aspect is explained in which the shortage $\Delta Y$ is divided equally and $\Delta Y/2$ is added to the adjacent pixels respectively, but the distribution may be uneven. For example, by referring to and comparing the input values of the two adjacent pixels, the amount of distribution is made relatively small for the adjacent pixel whose input value is relatively large. Due to this, it is possible to suppress the target value from becoming infeasible at the adjacent pixel. Similarly, it may also be possible to refer to the measurement curves of the two adjacent pixels and make relatively small the amount of distribution for the adjacent pixel whose measurement curve is located on the relatively upper side (relatively bright adjacent pixel). Further, in a case of a configuration in which it is possible to detect abnormality, such as non-ejection, ejection amount abnormality, and ejection direction abnormality, as the characteristic for each nozzle, it may also be possible to refer to the information on the defective nozzle whose abnormality has been detected and not to distribute the shortage on a condition that the adjacent nozzle is a defective nozzle. In a case where printing is performed by using the defective nozzle such as this, there is a possibility that instable reproduction will result, and therefore, it is appropriate to set the post-correction input value of the corresponding pixel to 0 at all times.

Further, in the example described above, in order to simplify explanation, the aspect is explained in which the shortage $\Delta Y$ at the adjacent pixel is not calculated at the time of correcting the input value of the adjacent pixel of the short pixel at S712. However, there may be a case where it is no longer possible to implement the target value at the adjacent pixel as a result of addition of $\Delta Y/2$ to the target value of the adjacent pixel. Consequently, it may also be possible to calculate the shortage $\Delta Y$ also at the adjacent pixel and add the shortage $\Delta Y$ to the target value of the pixel further next to the adjacent pixel in a case where the calculated shortage $\Delta Y$ is not 0. In the case such as this, the distribution of $\Delta Y$ is made uneven toward one direction. This processing can be performed repeatedly for any number of adjacent pixels, but it is appropriate to set a limit to the number of adjacent pixels in order to suppress unintentional trouble.

Further, in the example described above, the aspect is described in which the target value of the adjacent pixel is corrected by using the shortage $\Delta Y$, but it is possible to implement equivalent processing also by correcting the measurement curve of the adjacent pixel in place of the target value of the adjacent pixel. In this case, it is sufficient to uniformly shift the measurement curve 802 of the adjacent pixel shown in FIG. 8D by $\Delta Y/2$ in the upward direction.

Further, in the example described above, the aspect is explained in which the correction is performed also for the pixel in which a shortage occurs and the shortage is calculated in accordance with equation (1). However, it may also be possible not to perform correction for the pixel by regarding the nozzle corresponding to the pixel in which a shortage occurs as a defective nozzle. In such a case, it is possible to calculate the shortage by using equation (2) below.

[Mathematical Equation 2]

$$\Delta Y = \text{target value} - \text{measured value corresponding to input value (before correction) that is found in accordance with density characteristic} \quad \text{equation (2)}$$

Further, in the example described above, as the explanation of the HS processing, the aspect is explained in which the scan resolution of the measurement image is set to 1,200 dpi, which is the same as the resolution of the nozzle arrangement of the print head, and the input image is corrected in units of 1,200 dpi. However, the scan resolution is not limited to 1,200 dpi and is arbitrary. Further, as the measurement curve, it may also be possible to use the average value in units of pluralities of nozzles. By doing so, it is possible to reduce the storage capacity necessary for storing the measurement curve.

Third Embodiment

In the first embodiment, the aspect is explained in which in a case where it is not possible to sufficiently reduce density unevenness and streaks only by the HS processing for a defective nozzle, appropriate correction is performed for the target characteristic of the nozzle adjacent to the defective nozzle. In the first embodiment, also in a case where a non-ejection nozzle exists, the HS processing in which an appropriate target value is set to the adjacent pixel of the pixel corresponding to the non-ejection nozzle is performed, and therefore, it is possible to reduce white streaks resulting from ink non-ejection. However, at this time, the shortage ΔY in the non-ejection nozzle becomes large in the high-density area and the correction amount in the adjacent pixel becomes a large value. As a result of this, there is a case where the correction accuracy of the HS processing is reduced. This is a phenomenon that occurs because the measurement curve is affected by the neighboring nozzles due to the influence of the dot gain, the scanner characteristic, and the like. Because of this, it is favorable for the correction amount in the HS processing not to become a large value.

Consequently, in the present embodiment, an aspect is explained in which the conventional non-ejection complementation technique is combined in order to suppress the correction amount in the HS processing. Explanation of the configuration and processing in common to those of the first embodiment is omitted or simplified.

FIG. 3B is a block diagram showing the configuration of the image processing unit 302 according to the present embodiment. The binary data sent out from the quantization processing unit 307 is input to a non-ejection complementation processing unit 310. The non-ejection complementation processing unit 310 moves the dot corresponding to the position of the non-ejection nozzle so as to be printed by one of the adjacent nozzle on the left side and the adjacent nozzle on the right side. Specifically, first, by using a non-ejection nozzle detection unit, not shown schematically, the position of the non-ejection nozzle is acquired. Next, the binary data is referred to and in a case where the value "1" meaning printing exists at the pixel position corresponding to the non-ejection nozzle position, "1" is replaced with "0" meaning non-printing. After that, based on the information on the pixel adjacent to the non-ejection nozzle in the x-direction, in a case where the adjacent pixel is non-printing, the value "0" is replaced with the value "1".

In the present embodiment, in a case where the measurement image shown in FIG. 5 is printed only in a single ink color, the input image passes through the bypass path 309 indicated by the broken line in FIG. 3B. By designing such a configuration, the TRC processing, the quantization processing, and the non-ejection complementation processing are performed for the input image without passing through the input color conversion processing unit 303, the ink color conversion processing unit 304, and the HS processing unit 305.

By scanning the printing sheet 106 on which the measurement image is printed by the scanner 107, the scanned image is obtained. For the obtained scanned image, a change in density in the non-ejection unit is suppressed by the above-described non-ejection complementation processing. Because of this, the value of the shortage ΔY that is calculated at S705 in FIG. 7 does not become large, and therefore, it is possible to suppress an increase in the correction amount at S712.

<About Effect and Modification Example of the Present Embodiment>

As explained above, according to the present embodiment, by combining with the conventional non-ejection complementation technique, the correction amount in the HS processing is suppressed from becoming large and it is possible to appropriately reduce the white streaks resulting from the non-ejection nozzle.

In the example described above, the aspect is explained in which as the conventional non-ejection complementation technique, the method of moving a dot after quantization processing is adopted, but the non-ejection complementation method is not limited to this and it may also be possible to adopt an arbitrary method. For example, as the non-ejection complementation method, it may also be possible to design a configuration in which before the quantization processing, the non-ejection complementation processing to add the half of the input pixel value corresponding to the non-ejection nozzle position to the pixel values of the adjacent pixels on both the sides respectively is performed.

Fourth Embodiment

In the second embodiment, the aspect is explained in which the scan resolution of the measurement image is set to 1,200 dpi, which is the same as the resolution of the nozzle arrangement of the print head, and the HS processing is performed by using the measurement curve in units of nozzles. Further, that it may also be possible to use the average value in units of pluralities of nozzles as the measurement curve is also explained.

In contrast to this, in the present embodiment, an aspect is explained in which the HS processing in units of pluralities of printing elements and the HS processing in units of printing elements are performed in two separate stages. Explanation of the configuration and processing in common to those of the second embodiment is omitted or simplified.

FIG. 3C is a block diagram showing the configuration of the image processing unit 302 according to the present embodiment. The image data of the ink color signals sent out from the HS processing unit 305 is input to a low-frequency HS processing unit 311.

In the low-frequency HS processing unit 311, by the processing of the flowchart shown in FIG. 7, correction for the input image is performed. At this time, at step S702, the measurement curve is created by using the average value of neighboring pixels in the x-direction of the scanned image in place of the value of one pixel as in the embodiment described previously at the time of acquiring the measurement curve based on the scanned image. In this example, it is assumed that the average value of 20 neighboring pixels in the x-direction is used. That is, the low-frequency HS processing unit 311 performs correction for the low-frequency unevenness in units of 20 nozzles as the target.

In this example, at the time of printing the measurement image used by the low-frequency HS processing unit 311, the input image passes through the bypass path 309 indicated by the broken line in FIG. 3C. Further, at the time of printing the measurement image used by the HS processing unit 305, the input image passes through a bypass path 312. By designing such a configuration, it is possible to take the measurement image used by the HS processing unit 305 as the image after the correction is performed by the low-frequency HS processing unit 311.

<About Effect of the Present Embodiment>

According to the present embodiment, it is made sufficient to perform the correction for only the high-frequency remaining difference that is not corrected by the low-frequency HS processing unit 311 as the target in the HS processing unit 305, and therefore, it is made possible to reduce the processing amount of the HS processing unit 305.

Fifth Embodiment

In the second embodiment, the aspect is explained in which each patch of the measurement image is printed only in a single ink color and the HS processing is performed for each ink color. However, even though the HS technique for each ink color as described above is used, there is a case where color unevenness occurs at the time of making an attempt to represent a multinary color by overlapping two or more kinds of ink. As a technique to solve the problem such as this, there is a technique called MCS (Multi Color Shading) processing.

In the present embodiment, an aspect is explained in which in a case where color unevenness remains only by the correction processing for a defective nozzle, appropriate correction is performed for the nozzle adjacent to the defective nozzle in the MCS processing.

FIG. 3D is a block diagram showing the configuration of the image processing unit 302 according to the present embodiment. The image data of the RGB signal sent out from the input color conversion processing unit 303 is input to an MCS processing unit 313. The MCS processing unit performs correction in accordance with the ejection characteristic of the nozzle configuring the print head for the image data of the RGB signal. Details of the MCS processing will be described later (see FIG. 10). The corrected RGB image is sent out to the ink color conversion processing unit 304.

The measurement image used in the MCS processing is an image in which a plurality of patches in which each of the R value, the G value, and the B value, which are the input signal values, is changed independently is printed. In this example, each value of the R value, the G value, and the B value is caused to have five tones of 0, 64, 128, 192, and 255 and 125 (=5^3) multinary color patches are printed. The combination of patches is not limited and an arbitrary combination of patches may be used. Further, for simplicity, the combination of the R value, the G value, and the B value is described as the RGB value.

In the present embodiment, at the time of printing the measurement image used by the MCS processing unit 313, the input image passes through a bypass path 314 indicated by the broken line in FIG. 3D. By designing the configuration such as this, it is possible to take the measurement image used by the MCS processing unit 313 as the image after correction is performed by the HS processing unit 305.

By scanning the measurement image described above by the scanner 107, the scanned image is obtained. The present embodiment differs from the first embodiment in that the scanned image is not converted into 1-channel image data but saved as 3-channel image data of R, G, and B.

[About MCS Processing]

Figure 10:
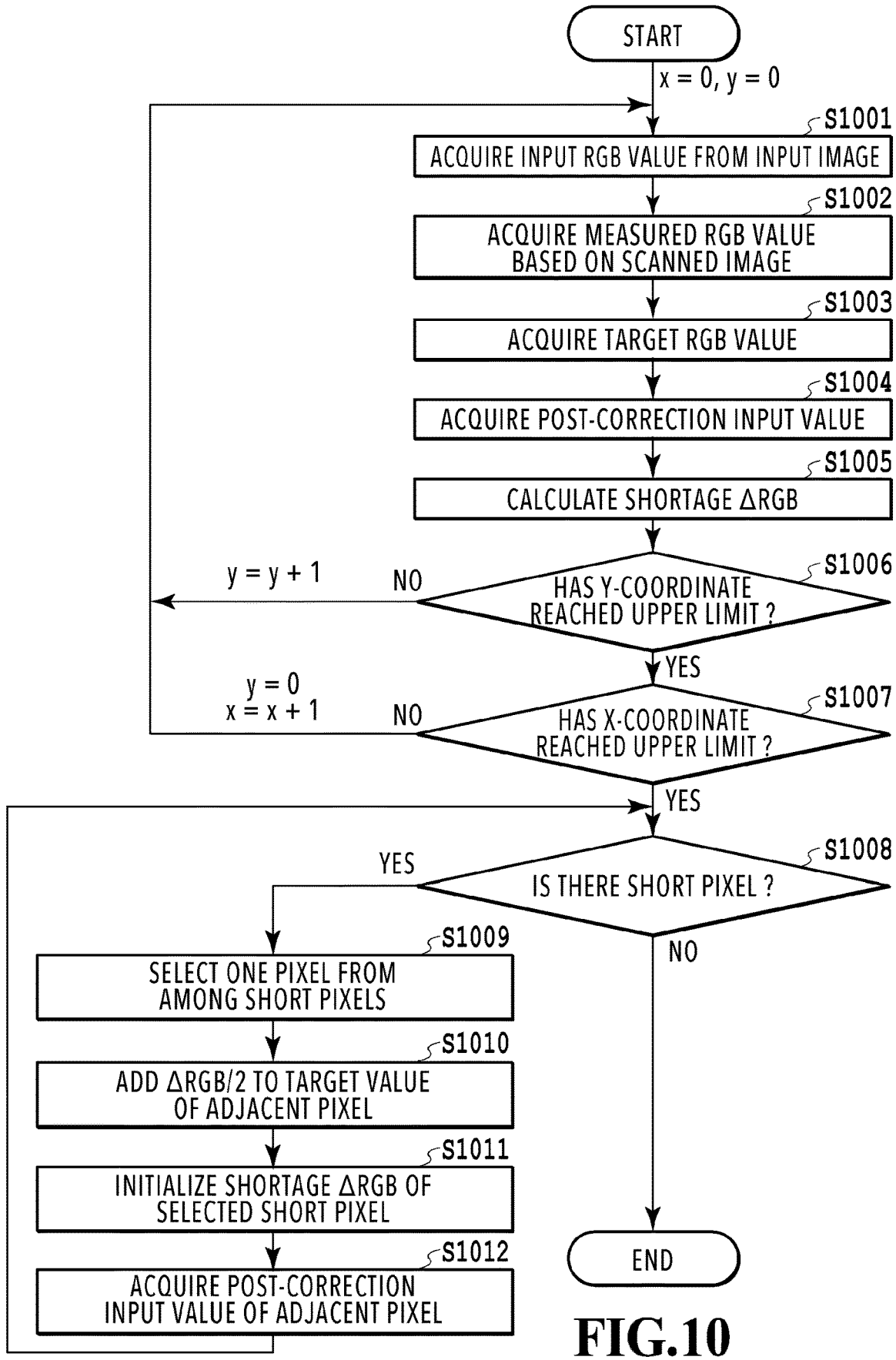
FIG. 10 is a flowchart of processing of the MCS processing unit 313 according to the fifth embodiment.

In the following, the MCS processing according to the present embodiment is explained by using FIG. 10. FIG. 10 is a flowchart of the MCS processing performed by the MCS processing unit 313. The main difference between the MCS processing and the HS processing lies in that the measurement image shown in FIG. 5 has multinary color patches and as the shortage, ΔRGB is used in place of ΔY.

First, at S1001, the MCS processing unit 313 takes the image data of the ink color signals output by the ink color conversion processing unit 304 as the input image and acquires the pixel value at the pixel of interest (x, y) of the input image as the input value (referred to as input RGB value).

At S1002, the MCS processing unit 313 acquires a measured RGB value at the position corresponding to the pixel of interest based on the scanned image obtained by performing a scan by the scanner 107. In this example, as the measured values of the 125 patches, the 125 measured RGB values are acquired.

At S1003, the MCS processing unit 313 acquires a target RGB value. In this example, by referring to an LUT, not shown schematically, which stores a correspondence relationship between the input RGB value and the target RGB value of the scanned image, the target RGB value is acquired.

Figure 9A:
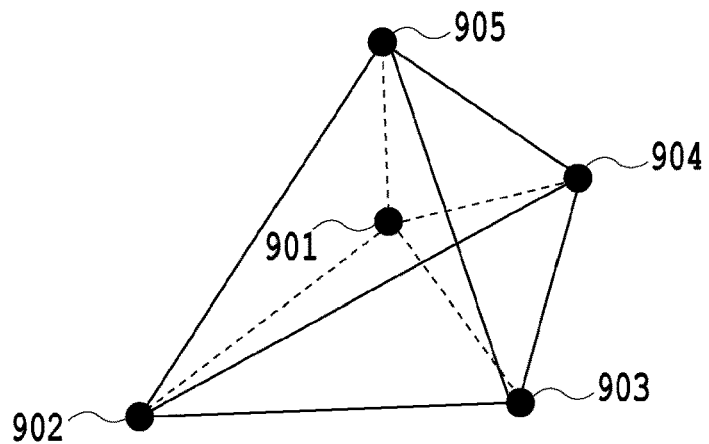
FIG. 9A to FIG. 9C are each a diagram for explaining processing of an MCS processing unit 313 according to a fifth embodiment.

At step S1004, the MCS processing unit 313 acquires a post-correction input value. The acquisition method of a post-correction input value is explained by using FIG. 9A. FIG. 9A is a three-dimensional space whose axes are the R value, the G, value, and the B value respectively of the scanned image. Symbol 901 in FIG. 9A indicates the target RGB value acquired at S1003. Further, symbols 902 to 905 indicate the measured RGB values at four points selected so as to configure a minimum tetrahedron including the target RGB value 901 from among the 125 measured RGB values acquired at S1002.

By calculating the distances between the target RGB value 901 and the above-described four measured RGB values 902 to 905 respectively, and interpolating these measured RGB values in accordance with the ratio of the distances, it is possible to calculate the post-correction input value.

At S1005, the MCS processing unit 313 calculates the shortage ΔRGB. The shortage in the present embodiment means the amount that is short only by the correction at S1004, that is, the shortage of the amount of correction and can be calculated by using equation (3) below.

[Mathematical Equation 3]

$$\Delta RGB = \text{target } RGB \text{ value} - \text{post-correction input } RGB \text{ value} \qquad \text{equation (3)}$$

In the example shown in FIG. 9A, ΔRGB is a vector whose magnitude is 0.

Figure 9B:
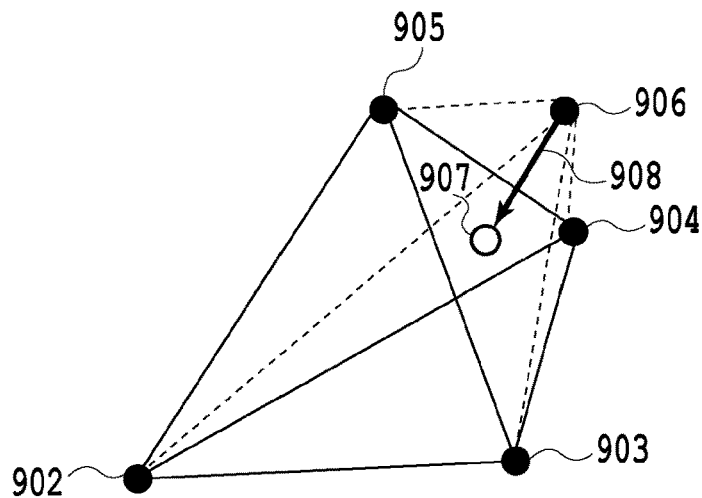

FIG. 9B shows an example in which |ΔRGB|>0. Symbol 906 in FIG. 9B indicates the target RGB value. At this time, there is a case where measured RGB values configuring a tetrahedron including the target RGB value do not exist. In that case, the shortage ΔRGB is calculated by taking the RGB value (symbol 907 in FIG. 9B) whose distance to the target RGB value is the minimum from the inside of the tetrahedron as the post-correction input value. An arrow 908 in FIG. 9B indicates a vector corresponding to the shortage ΔRGB.

At S1006, the MCS processing unit 313 determines whether the y-coordinate of the pixel of interest has reached the upper limit (in other words, whether the position of the pixel of interest has reached the bottom end of the input image). In a case where determination results at this step are affirmative, the processing advances to S1007. On the other hand, in a case where determination results at this step are negative, 1 is added to the value of y and the processing returns to S1001.

At S1007, the MCS processing unit 313 determines whether the x-coordinate of the pixel of interest has reached the upper limit (in other words, whether the position of the pixel of interest has reached the right end of the input image). In a case where determination results at this step are affirmative, the processing advances to S1008. On the other hand, in a case where determination results at this step are negative, the value of y is initialized to 0, 1 is added to the value of x, and the processing returns to S1001.

At S1008, the MCS processing unit 313 determines whether there is a short pixel. Here, the short pixel means a pixel whose |ΔRGB| is not zero. In a case where determination results at this step are affirmative, the processing advances to S1009. On the other hand, in a case where determination results at this step are negative, the MCS processing is terminated.

At S1009, the MCS processing unit 313 selects one pixel from among the short pixels. The short pixel selected at this step is referred to as a short pixel of interest.

Figure 9C:
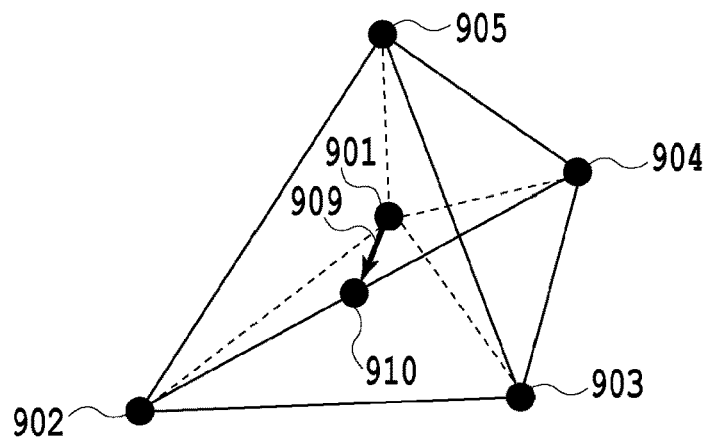

At S1010, the MCS processing unit 313 adds a vector ΔRGB/2 to the target value for the adjacent pixel of the short pixel of interest. FIG. 9C shows an example in which the vector ΔRGB/2 is added to the target value of the adjacent pixel. First, the vector ΔRGB/2 indicated by symbol 909 is added to the target RGB value indicated by symbol 901 and the target value becomes a value indicated by symbol 910.

At S1011, the MCS processing unit 313 initializes the shortage ΔRGB in the short pixel of interest to 0.

At S1012, the MCS processing unit 313 acquires the post-correction input value of the adjacent pixel. The acquisition method of the post-correction input value is the same as that at S1004. In a case where the processing at S1012 is completed, the processing returns to S1008 and whether there is a short pixel is determined again. The above is the contents of the MCS processing according to the present embodiment.

<About Effect and Modification Example of the Present Embodiment>

As explained above, according to the present embodiment, in a case where the color unevenness remains only by the correction processing for a defective nozzle, it is possible to reduce the color unevenness in the MCS processing.

In the example described above, the measurement image is taken as the RGB image and the shortage is taken as ΔRGB, but the color space that is used is not limited to the RGB color space and is arbitrary. For example, it may also be possible to use the CIEXYZ color space or the CIELab* color space.

Other Embodiments

In the embodiments described previously, the case is explained where printing is performed by using the four color inks of K, C, M, and Y, but the present invention is not limited to the aspect such as this. For example, it is also possible to obtain the effect described previously by similarly applying the present invention to an aspect in which printing is performed by using the low-density inks, such as pale cyan, pale magenta, and gray inks, or the spot color inks, such as red, green, blue, orange, and violet inks.

Further, in the embodiments described previously, the case is explained where the image processing is performed by the image processing unit 302 for the image data that is input in the RGB format, which is the color signals of the three primary colors. However, a configuration may also be accepted in which image data in which each pixel has a 4-channel (that is, K, C, M, Y) pixel value is input directly to the printing apparatus 100. In this case, the processing of the input color conversion processing unit 303 and the ink color conversion processing unit 304 is no longer necessary in the image processing unit 302.

Further, it may also be possible to appropriately combine each embodiment described previously.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, in a case where it is not possible to implement sufficient correction only by the correction for a defective nozzle, it is made possible to reduce density unevenness and streaks in an image that is printed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-200675, filed Oct. 25, 2018, which is hereby incorporated by reference wherein in its entirety.

What is claimed is:

1. An image processing apparatus that performs processing for an input image for an image forming apparatus performing printing on a printing medium by using a print head in which a plurality of printing elements is arrayed, the image processing apparatus comprising:
   a density characteristic acquisition unit configured to acquire density characteristic indicating an output density for each tone of a patch image for each of the printing elements, the patch image being different from the input image;
   a target value acquisition unit configured to acquire a target characteristic indicating a target value for the each tone; and
   a correction unit configured to correct the input image based on the density characteristic information and the target value, wherein
   the correction unit corrects one of a target characteristic and a density characteristic corresponding to an adjacent printing element adjacent to a printing element of interest of the plurality of printing elements based on an input value of a pixel of the input image corresponding to the printing element of interest and one of the target characteristic and the density characteristic both corresponding to the input value of the adjacent printing element to correct the input image based on one of the corrected target characteristic and density characteristic.

2. The image processing apparatus according to claim 1, wherein
the correction unit corrects an input value so that a difference between an output density corresponding to the input value in the input image and the target value becomes small.

3. The image processing apparatus according to claim 1, further comprising:
a calculation unit configured to calculate a shortage corresponding to tones that the printing element cannot implement based on the density characteristic and the target characteristic for each of the printing elements, wherein
the correction unit corrects density characteristic corresponding to the adjacent printing element or a target characteristic corresponding to the adjacent printing element based on the shortage of the printing element of interest.

4. The image processing apparatus according to claim 3, further comprising:
a determination unit configured to determine whether there is a printing element whose shortage is not zero, wherein
in a case where there is a printing element whose shortage is not zero, the correction unit corrects density characteristic corresponding to the adjacent printing element or a target characteristic corresponding to the adjacent printing element by taking a printing element adjacent to a printing element whose shortage is not zero as the printing element of interest.

5. The image processing apparatus according to claim 3, wherein
the calculation unit calculates the shortage at each pixel position of the input image.

6. The image processing apparatus according to claim 5, further comprising:
a determination unit configured to determine whether there is a pixel whose shortage is not zero, wherein
in a case where there is a pixel whose shortage is not zero, the correction unit corrects the output density or the target value, which corresponds to a pixel adjacent to a pixel whose shortage is not zero.

7. The image processing apparatus according to claim 3, wherein
the shortage is a difference between the target value and the output density before correction or a difference between the target value and the output density after correction.

8. The image processing apparatus according to claim 3, wherein
the correction unit corrects a measured value or the target value for a printing element adjacent to the printing element of interest based on the shortage for the printing element of interest and the shortage or the input value for a printing element adjacent to the printing element of interest.

9. The image processing apparatus according to claim 3, wherein
the correction unit corrects a measured value or the target value for a printing element adjacent to the printing element of interest based on the shortage for the printing element of interest and information indicating whether there is abnormality in a printing element adjacent to the printing element of interest.

10. The image processing apparatus according to claim 3, further comprising:
a third correction unit configured to correct the input value for the printing element of interest to a value indicating non-ejection in a case where the shortage in the printing element of interest is more than or equal to a predetermined threshold value.

11. The image processing apparatus according to claim 10, wherein
correction processing by the first correction unit is performed before correction processing by the third correction unit.

12. The image processing apparatus according to claim 3, wherein
for head shading processing performed by the target value acquisition unit, the correction unit and the calculation unit processing in two stages, that is, high-frequency head shading processing in units of printing elements and low-frequency head shading processing in units of pluralities of printing elements are performed.

13. The image processing apparatus according to claim 1, wherein
the image forming apparatus includes a plurality of print heads ejecting printing color materials different in color from one another and
the correction unit performs correction for each of the printing color materials.

14. The image processing apparatus according to claim 1, wherein
the image forming apparatus includes a plurality of print heads ejecting printing color materials different in color from one another and
the correction unit performs correction for each combination of the printing color materials.

15. The image processing apparatus according to claim 1, further comprising:
a detection unit configured to detect a non-ejection printing element incapable of ejecting a printing color material; and
a non-ejection complementation unit configured to replace a value of dot data corresponding to the non-ejection printing element with a value indicating non-ejection in a case where a value of the dot data indicating whether or not to perform ejection corresponding to the non-ejection printing element indicates ejection and on the other hand, replace a value indicating non-ejection with a value indicating ejection for a value of the dot data corresponding to a printing element adjacent to the non-ejection printing element.

16. An image processing method for an image processing apparatus that performs processing for an input image for an image forming apparatus performing printing on a printing medium by using a print head in which a plurality of printing elements is arrayed, the image processing method comprising:
a density characteristic acquisition step of acquiring density characteristic information indicating an output density for each tone for each of the printing elements;
a target value acquisition step of acquiring a target characteristic indicating a target value for each tone; and
a correction step of correcting the input image based on the density characteristic information and the target value, wherein
in the correction step, one of a target characteristic and a density characteristic corresponding to at least one printing element of interest of the plurality of printing elements is corrected based on an input value of a pixel of the input image corresponding to an adjacent printing element adjacent to the printing element of interest and an output density corresponding to the input value of the adjacent printing element, and the input image is corrected based on one of the corrected target characteristic and density characteristic.

\* \* \* \* \*